United States Patent [19]

Kataoka et al.

[11] Patent Number: 5,424,112
[45] Date of Patent: Jun. 13, 1995

[54] INJECTION MOLDING OF A SYNTHETIC RESIN

[75] Inventors: Hiroshi Kataoka, Ota; Masanori Mawatachi, Yokohama, both of Japan

[73] Assignee: Asahi Kasei Kogyo Kabushiki Kaisha, Osaka, Japan

[21] Appl. No.: 102,730

[22] Filed: Aug. 6, 1993

[30] Foreign Application Priority Data

Nov. 24, 1992 [JP] Japan ................... 4-334906

[51] Int. Cl.6 .................... B32B 3/00; B29C 33/48
[52] U.S. Cl. ..................... 428/156; 428/158; 428/166; 428/178; 428/188; 428/172; 264/45.1; 264/523; 264/DIG. 83
[58] Field of Search ............... 428/156, 172, 158, 71, 428/542.8, 166, 178, 188; 264/45.1, 51, 523, 728, 575, 241, 500, DIG. 83

[56] References Cited

U.S. PATENT DOCUMENTS

| | | | |
|---|---|---|---|
| 3,947,175 | 3/1976 | Melcher | 425/130 |
| 4,140,672 | 2/1979 | Kataoka | 264/45.1 |
| 4,657,496 | 4/1987 | Ozeki et al. | 425/130 |
| 4,824,732 | 4/1989 | Hendry et al. | 428/542.8 |
| 4,923,666 | 5/1990 | Yamazaki et al. | 264/572 |
| 5,149,482 | 9/1992 | Sorensen | 264/255 |

FOREIGN PATENT DOCUMENTS

0043543A1  1/1982  European Pat. Off. .
0341310A1  11/1989 European Pat. Off. .

Primary Examiner—Donald J. Loney
Attorney, Agent, or Firm—Birch, Stewart, Kolasch & Birch

[57] ABSTRACT

An injection molding of a synthetic resin having a foamed injection pressure transmission material remaining in an injection pressure transmission channel can be produced with lower clamping force and with greater dimensional accuracy. The molding preferably has the following characteristics:

(1) a thick-walled section is substantially connected to a gate;
(2) an injection pressure transmission channel is formed in the inside of the thick-walled section;
(3) the injection pressure transmission channel is filled with the foamed injection pressure transmission material;
(4) the injection pressure transmission material comprises a foamable low molecular weight polymer:
(5) an amount of the injection pressure transmission material is 1/10 or less of that of the synthetic resin by volume;
(6) a viscosity of the low molecular weight polymer is 1/50 or less that of the synthetic resin at injection, and 0.5 poise or more;
(7) a ratio of (a viscosity of the low molecular weight polymer at 120° C.)/(that at 220° C.) is 100 or more; and
(8) Vicat softening temperature of the low molecular weight polymer is 60° C. or more.

The injection molding also exhibits a smooth surface without sink marks or warpages.

20 Claims, 7 Drawing Sheets

INJECTION MOLDING OF A SYNTHETIC RESIN

BACKGROUND OF THE INVENTION

1. Field of the Invention

The present invention relates to an injection molding of a synthetic resin, and a molding method and molding apparatus therefor. Particularly, it relates to a large-sized molding which is excellent in dimensional accuracy and has smooth appearance without sink marks or warpages.

2. Description of Related Art

An injection molded article of a synthetic resin (hereinafter an injection molding of a synthetic resin) is generally obtained by injection molding a heat-plasticized synthetic resin in a mold cavity. In order to obtain the desired injection molding, it is necessary to inject, with a high pressure, the synthetic resin into a mold which is clamped with a sufficient mold clamping force. In general, the mold clamping force requires 300 to 500 $Kg/cm^2$ per projected area of a molding so that the force of an injection molding apparatus becomes extremely big. A mold clamping force of several thousand tons is generally required to mold a large-sized molding. If the large-sized molding can be produced with a small mold clamping force, this will be very economic.

As the injection molding becomes thin-walled and large, the injection pressure from the injection cylinder is not sufficiently transmitted to the end of a mold cavity. This is because the injection pressure applied to the synthetic resin in the injection cylinder is transmitted to the synthetic resin at the end of the mold cavity through the synthetic resin previously injected into the mold cavity. Therefore, the pressure is remarkably lost between a gate section and the end of the mold cavity. In the case of a large-sized molding apparatus, the injection pressure at the end of the mold cavity is often down to about one tenth of the pressure at the gate section. In the case of ordinary injection molding, the injection pressure of 1000 $Kg/cm^2$ is often down to about; 100 $Kg/cm^2$ at the end of the mold cavity. An average pressure between the gate section and the end of the mold cavity per projection area of the whole of the molding is from 300 to 500 $Kg/cm^2$. Accordingly, the necessary mold clamping force is also from 300 to 500 $Kg/cm^2$.

As seen from the above, the pressure loss is big and the pressure is not effectively transmitted in general injection molding methods. Accordingly, in order to produce a large-sized molding, it is necessary to use an injection molding apparatus having a high injection pressure and mold clamping force. Further, problems such as the warpage of the molding and inaccuracy in a molding dimension occur due to the big difference between the pressures at the gate section and at the end of the mold cavity.

It is generally difficult to apply a pressure, which is sufficient enough to prevent sink marks, on the whole of the molding. The molding is designed so as to prevent sink marks. This limits the variety of molding designs. For example, there has been popularly designed a molding having a thin-walled rib and a boss with a small diameter or a molding having ribs thinner than a molding surface. It is difficult to lighten the molding as a whole by making strong thick-walled ribs at only the part of the molding requiring strength while thinning the molding surface. It is also difficult to reduce the number of parts of the built-up molding by using big bosses.

As methods to solve the above problems, there have been proposed a foaming injection molding method wherein a foaming agent is incorporated with a synthetic resin for injection molding, and a gas assisted injection molding method wherein a gas is injected after the injection of a synthetic resin.

U.S. Pat. Nos. 4,824,732 and 4,923,666, etc. describe the gas assisted injection molding method in detail.

U.S. Pat. No. 4,923,666 proposes to form a gas channel with gas in a thick-walled section, e.g., at a rib root and the like to prevent sink marks which easily occur at thick-walled sections and to transmit the injection pressure to the end of the molding.

U.S. Pat. No. 4,824,732 discloses a method for producing a hollow molding with a non-plastic fluid which is discharged to the outside of the mold after molding. The fluid used is a gas or a gas-like fluid having a very low viscosity.

A molding method called a sandwich injection molding method has been widely known to the public. The method comprises injecting a first synthetic resin and a second synthetic resin into a mold cavity to fill it up and form a so-called sandwich structure having a skin-core structure. In this method, it is difficult that the injected second resin forms an injection pressure transmission channel such as a gas channel. Indeed, forming such a channel by the second resin has not been reported in the prior art.

U.S. Pat. No. 5,149,482 discloses a method for reducing the mold clamping force in the sandwich injection molding method by forming a mold cavity wherein a thick-walled fluid passageway is formed in a portion of a thin-walled section of the mold cavity. In this method, the difference in wall thicknesses between the thin-walled section and the thick-walled section should be made extremely large in order to let the second resin selectively go through the thick-walled fluid passageway. As a result, the amount of the second synthetic resin increases. This patent does not mention the difference in viscosities between the first synthetic resin and the second synthetic resin corresponding to a low molecular weight polymer in the present invention. However, as will be discussed below, the difference in viscosities is an important feature of the present invention. The invention of the U.S. patent has difficulties if the amount of the second synthetic resin is reduced to the amount of the low molecular weight polymer used in the present invention for reducing the mold clamping force sufficiently.

U.S. Pat. No. 4,140,672 discloses a method comprising injecting a synthetic resin into a mold cavity, subsequently injecting a low viscosity fluid to fill the mold cavity and then discharging the low viscosity fluid to the outside of the mold, in which method a sandwich structure of a skin-core structure is formed during molding process as well as in a sandwich injection molding method. However, there is no mention about an injection pressure transmission channel formed by a low viscosity fluid.

Heretofore, it has been believed that a fluid forming the injection pressure transmission channel is a gas or a gas-like fluid. The gas assisted injection molding method is an excellent molding method. In the gas assisted injection molding method, however, a high pressure gas like nitrogen gas having a pressure of 200 to 300 $Kg/cm^2$ is employed so that various problems such as high expenditure on facilities and special safety precautions occur. Additionally, in Japan, various other steps are required in order to comply with Japan's High Pressure Gas Regulation Act. When gas pressure is increased to improve reproducibility of molding appearance, expenditure on facilities is further increased. The present invention has been carried out to solve such problems. The present invention provides a large-sized molding which is injection molded with low clamping force, has excellent dimensional accuracy and has smooth appearance without sink marks or warpages.

SUMMARY OF THE INVENTION

The present invention provides an injection molding of synthetic resin, comprising a thin-walled general section of synthetic resin having a gate and a thick-walled section contained therein, said thick-walled section being substantially connected to said gate and containing in the inside of said thick-walled section an injection pressure transmission channel that is filled with a foamed injection pressure transmission material;

said injection pressure transmission material comprising a foamable low molecular weight polymer which, at injection, has a viscosity of at least 0.5 poise but less than or equal to 1/50 of the viscosity of said synthetic resin, at injection, and wherein the ratio of the viscosity of said low molecular weight polymer at 120° C. to the viscosity of said low molecular weight polymer at 220° C. is at least 100/1;

said low molecular weight polymer having a Vicat softening temperature of at least 60° C.;

said thick-walled section containing said foamed injection pressure transmission material in an amount up to 1/10 the amount of said synthetic resin, by volume.

The present invention also provides a molding method suitable for producing the molding described above. The molding method of the present invention which comprises:

heat plasticizing a synthetic resin in a main injection cylinder;

heat-plasticizing an injection pressure transmission material which comprises a low molecular weight polymer having a chemical foaming agent incorporated therein, in a sub-injection cylinder to a temperature that is less than the decomposition temperature of said foaming agent;

injecting through a nozzle said synthetic resin into a mold cavity and subsequently or simultaneously therewith, injecting through a nozzle said injection pressure transmission material into said mold cavity, wherein said injection pressure transmission material is heated, when in the vicinity of the nozzle or inside said mold cavity, to a temperature that is equal to or greater than the decomposition temperature of said foaming agent;

said injection pressure transmission material having, at injection, a viscosity of at least 0.5 poise but less than or equal to 1/50 of the viscosity of said synthetic resin, at injection, and wherein the ratio of the viscosity of said low molecular weight polymer at 120° C. to the viscosity of said low molecular weight polymer at 220° C. is at least 100/1;

said low molecular weight polymer having a Vicat softening temperature of at least 60° C.

BRIEF DESCRIPTION OF THE DRAWINGS

FIG. 2-1 is a top view of the first example of the molding in the present invention.

FIG. 2-2 is a sectional view of the molding shown in FIG. 2-1 taken along line A—A'.

FIG. 3-1 is a top view of the second example of the molding in the present invention.

FIG. 3-2 is a sectional view of the molding shown in FIG. 3-1 taken along line B—B'.

FIGS. 4-1 and 4-2 are sectional views of the thick-walled section and the general section of the moldings in the present invention.

FIG. 5-1 is a sectional view of one example of conventional moldings.

FIG. 5-2 is a sectional view of another example of conventional moldings.

FIG. 6-1 is a sectional view of the third example of the molding in the present invention.

FIG. 6-2 is a perspective view of the fourth example of the molding similar to that in FIG. 6-1 in the present invention.

FIG. 7-1 is a top view of the fifth example of the molding in the present invention.

FIG. 7-2 is a sectional view of the molding shown in FIG. 7-1 taken along line C—C'.

DESCRIPTION OF NUMERALS

Figure 1:
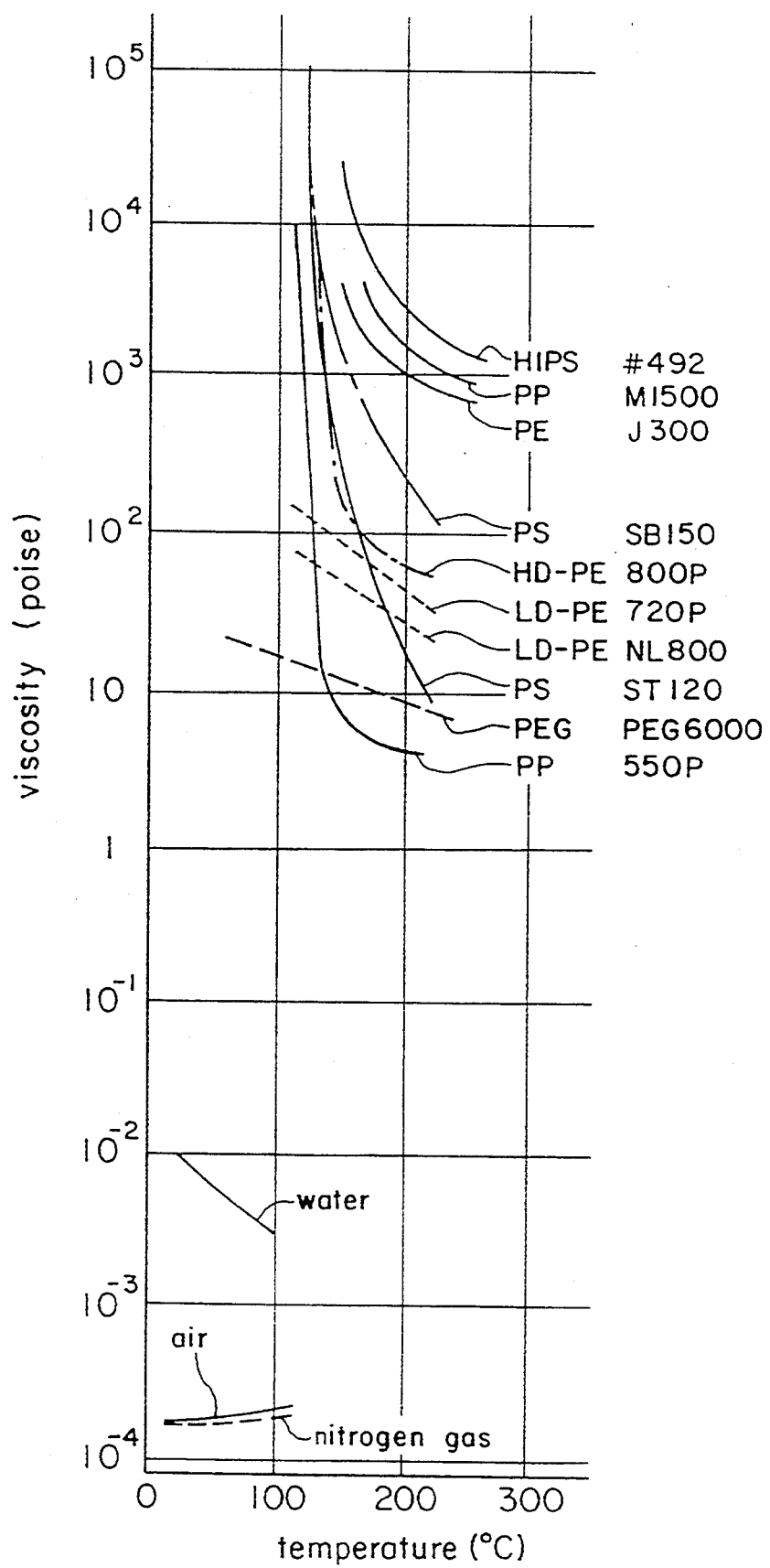
FIG. 1 is a graph showing a relation between temperatures and viscosities of some polymers.

1: gate
2: molding
3: injection pressure transmission channel
4: end of injected resin
5: thick-walled section
6: molding
7: gate
8: end of injected resin
9: rib
10: injection pressure transmission channel
11: general section of molding
12: rib
13: root of rib
14: diameter of an imaginary circle in cross-section of thick-walled section of molding
15: diameter of imaginary circle in cross-section of general section of molding
16: thick-walled section
17: boss
18: sink mark
19: injection pressure transmission channel
20: gate
21: molding
22: injection pressure transmission channel
23: thick-walled section
24: main injection cylinder
25: sub-injection cylinder
26: nozzle
27: needle valve

DETAILED DESCRIPTION OF THE INVENTION

The injection molding of the synthetic resin of the present invention comprises a thin-walled general section of synthetic resin having a gate mark and a thick-walled section contained therein, said thick-walled section being substantially connected to said gate mark and containing in the inside of said thick-walled section an injection pressure transmission channel (hereinafter IPT channel) that is filled with a foamed injection pressure transmission material (hereinafter a foamed IPT channel material).

The synthetic resins useful in the present invention include any synthetic resin generally used in injection molding, for example, polyolefins such as polyethylene and polypropylene; polystyrene and other styrene resins such as styrene-acrylonitrile copolymer and ABS resins; polyamides such as nylon 6 and nylon 66; polyacetal; polyesters; polyphenylene ether; and polyvinyl chloride.

The foamed IPT material is a material which is foamed to transmit an injection pressure. The low molecular weight polymer (hereinafter LMW polymer) containing a foaming agent is used as the foamable IPT material of the present invention. Most of the foamed IPT material is not discharged to the outside of the molding but remains in an IPT channel after forming the channel.

The general section of the molding in the present invention is thin-walled and refers to a section occupying a main section of each part of the molding. For example, in a box type molding, the general section indicates its bottom and sides. It is acceptable that a thickness of the bottom differs from that of the sides. In this case, the thicknesses of the general sections at the bottom and side naturally correspond to the thickness of the bottom and side of the molding. Most part of the general section has a thickness of 1 to 6 mm, preferably 1.5 to 4.5 mm. The thick-walled section is partially located in the general section.

In the thick-walled section, a ratio of (a diameter of an imaginary circle in a cross-section of the thick-walled section of the molding) to (that of the general section of the molding) is preferably from 1.5 to 3.5, more preferably from 1.8 to 3.0. The ratio is calculated from the thick-walled section and the general section on the same face. In a box type molding, when the thick-walled section at the bottom is adopted for the calculation, the general section at the bottom is adopted. The diameter of-the imaginary circle in the cross-section of the molding refers to a diameter of the largest sphere which is drawn in the molding cross-section without extending beyond the molding. In the sectional view of the molding, the diameter of the sphere corresponds to a diameter of the largest circle in the cross-section. When the diameter is small, the IPT material does not flow smoothly. When the diameter is too big, a cooling time becomes unpreferably long.

The thick-walled section substantially connects to the gate mark and continues towards the end of the injected resin. "The thick-walled section being substantially connected to said gate mark" means that there is a thick-walled section necessary to continuously form an IPT channel from the gate mark to the end of the injected resin. Accordingly, it is acceptable, in the present invention, that there is a space between the gate mark and the thick-walled section or a break in the middle of the thick-walled section if the IPT channel continues. Generally, if the space between the gate mark and thick-walled section is 20 mm or less or the break in the middle of the thick-walled section is 5 mm or less, the IPT channel can be continuously formed. The end of the injected resin indicates the farthest part from the gate mark of the molding, so that this is the most difficult part to transmit an injection pressure without a special IPT channel.

"The thick-walled section containing in the inside of the thick-walled section an IPT channel" herein suggests that most of the IPT material is contained in the IPT channel which is formed inside the thick-walled section. It is acceptable, in the present invention, that the IPT material is contained in a small amount inside the general section of the molding. For example, a part of the IPT material may easily enter into the inside of the general part near the gate mark. This is also acceptable.

In order to effectively transmit an injection pressure to the end of an injected resin, the IPT channel preferably reaches the vicinity of the end of the injected resin, more preferably 70% or more of a distance from the gate mark to the end of the injected resin, and most preferably reaches the end of the injected resin. The vicinity of the end of the injected resin indicates 60% or more of a distance from the gate mark to the end of the injected resin.

The present invention includes the case wherein the IPT channel does not reach the vicinity of the end of the injected resin. That is, the IPT channel is formed by aiming at preventing sink marks at a thick-walled rib or a thick-walled boss other than at transmitting the injection pressure. When the thick-walled rib or the thick walled boss is located near the gate mark or halfway of the gate mark and the end between the injected resin, it is acceptable that the IPT channel reaches near the rib or boss.

If the molding is formed, in advance, in a shape so as to easily form a channel, the IPT material can go into the inside of the thick-walled section at a desired location. That is, since the LMW polymer composed of the IPT material has a property of selectively going along the thick-walled section, the purpose of the present invention can be achieved by forming, in advance, a thick-walled passageway from the gate mark to the end of the injected resin in the molding.

The IPT material comprises a foamable LMW polymer.

The IPT material of the present invention comprises a foamable LMW polymer containing a foaming agent. Since the IPT channel is formed inside the thick-walled section, depressions, so-called sink marks, easily occur on the surface of the thick-walled section because of cooling shrinkage. In order to prevent the sink marks, the IPT material comprises the foamable LMW polymer containing foaming agents. With respect to the foaming agents, either a physical foaming agent or a chemical foaming agent, both of which are generally used in injection molding, can be used. Such foaming agents include pentane, hexane, propane, carbon dioxide gas, azodi-carbonamide, N,N'-dinitrosopentamethylenetetramine and sodium bicarbonate. An amount of the foaming agent to be added is preferably from 0.1 to 5% by weight. By adding the foaming agents to the LMW polymer, a foaming gas is generated. The foaming gas provides pressure which counteracts the rapid decrease in pressure in the mold caused by the cooling and volume shrinkage of the injected synthetic resin. Hence a state under pressure is maintained. That is, the foaming agent-containing LMW polymer, which has entered into the thick-walled section, foams in order to supplement volume shrinkage of the synthetic resin and the LMW polymer. A foaming ratio depends on the shape of the molding. Generally, it is from 1 to 50% of a volume of the LMW polymer by volume.

The amount of the IPT material is 1/10 or less of that of the synthetic resin by volume.

The IPT material, which transmits an injection pressure, works as a material in the form of a low viscosity fluid when the IPT material is injected. Its amount is preferably as small as possible in the range where performance of the molding such as mechanical strength is not lowered. A volume ratio of the IPT material to the synthetic resin is preferably from 1/200 to 1/10, more preferably from 1/100 to 1/15.

The viscosity of the LMW polymer is 1/50 or less of that of the synthetic resin at injection, and 0.5 poise or more.

Generally, the viscosity depends on a shear rate. The viscosity indicates a viscosity at injection in the present invention. Concretely, it is a viscosity all the time when the LMW polymer or the synthetic resin is injected from a nozzle. At injection, the temperature is equal to the temperature of the nozzle, but the shear rate varies depending on a molding condition. Consequently, a shear rate of 1,000 (1/second), which is close to the shear rate of a synthetic resin flowing in the mold at a general injection temperature, is employed to measure a viscosity. The viscosity is directly or indirectly measured by using a Capirograph (manufactured by Toyo Seiki Seisaku-sho, Ltd.).

When the viscosity of the LMW polymer is over 1/50 of that of the synthetic resin, the injection pressure is not effectively transmitted and the IPT channel is not successfully formed. The viscosity of the LMW polymer is preferably 1/100 or less of that of the synthetic resin in order to very effectively transmit the injection pressure. When the viscosity of the LMW polymer is less than 0.5 poise, problems in safety during injection can occur and the LMW polymer does not have the necessary Vicat softening temperature. It is preferred that the viscosity of the LMW polymer is 1 poise or more.

The viscosity of a polymer increases with the increase of the polymerization degree of the polymer. However, the relation between the viscosity and the polymerization degree depends also on a type of the polymer. It is represented by the following two formulas when a boundary is formed at a certain molecular weight called "critical molecular weight".

When the molecular weight is under the critical molecular weight, the relation is represented by the following formula:

$$\mathrm{Log}(\eta) = a\mathrm{Log}(Mw) + K(T) \quad 1 < a < 1.8$$

$K(T)$: constant determined by a material and a temperature
$Mw$: weight-average molecular weight
$\eta$: *viscosity*

When the molecular weight of the polymer is over the critical molecular weight, viscosity $\eta$ rapidly increases proportionally to 3.4th power of molecular weight $Mw$. This relation is represented by the following formula:

$$\mathrm{Log}(\eta) = 3.4\mathrm{Log}(Mw) + K(T)$$

This formula is famous as "Flory-Fox's 3.4th power rule".

When the molecular weight of the polymer is over the critical molecular weight, the viscosity rapidly increases in general, because long molecules intertwine one another so that the whole molecules move with the movement of one molecule. Although there is a slight difference depending on the type of the molecule, the molecular weight is usually from about 10,000 to 40,000 as a weight-average molecular weight.

A polymer, whose molecular weight remarkably exceeds the critical molecular weight, is usually used for a synthetic resin, a synthetic fiber and the like. A polymer, whose molecular weight is around or under the critical molecular weight, is not usually used for a synthetic resin. Physical and chemical properties of the synthetic resin appears only when the resin has a high molecular weight, far over the critical molecular weight, and the molecules sufficiently intertwine with one another.

The LMW polymer of the present invention preferably has a molecular weight around the critical molecular weight. It is not preferred that the LMW polymer has a molecular weight which is far over or under the critical molecular weight.

When the synthetic resin is a resin having a difficulty in processing or has a remarkably big molecular weight and high viscosity, the present invention accepts the LMW polymer having a viscosity of 100 poise or more. It may employ a general synthetic resin as the LMW polymer. Also, a polymer having a molecular weight over the critical molecular weight can be employed because of its relatively small molecular weight compared with that of the synthetic resin.

When Newtonian fluid is employed, the pressure loss of a fluid travelling between parallel boards is represented by the following formula:

$$\Delta P = \beta \cdot l \eta Q / H^2$$

$\Delta P$: pressure loss
$\eta$: viscosity
$Q$: flow rate
$H$: distance between parallel boards
$\beta$: constant
$l$: travelling distance of fluid As seen from the above formula, the pressure loss is proportional to the viscosity.

If the IPT channel, which is filled with the LMW polymer having a viscosity of 1/50 or less in relation to the synthetic resin, reaches the vicinity of the end of the injected resin at injection, pressure loss $\Delta P$ of the LMW polymer is 1/50 or less of that of the synthetic resin. Hence the injection pressure is effectively transmitted to the end of the injected resin. As a result, the injection pressure and the mold clamping force of the injection molding apparatus can be reduced. Further, the warpage of the molding decreases and dimensional accuracy of the molding is enhanced because pressures near the gate of the molding and the end of the injected resin are uniformized.

When gas is used as the IPT material, pressure loss $\Delta P$ of gas is about $1/10^6$ of that of the synthetic resin, since the viscosity of gas is about $1/10^6$ of that of the synthetic resin. (The gas assistance injection molding method employs a gas as the IPT material.) It is not necessary to reduce pressure loss $\Delta P$ to such a level. When the pressure loss $\Delta P$ is 1/50 or less of that of the synthetic resin, the injection pressure is effectively transmitted to the end of the resin fluid. When pressure loss $\Delta P$ is 1/100 or less or 1/1000 or less of that of the synthetic resin, the pressure loss does not substantially affect the injection pressure transmission.

In a well-known molding method called a sandwich injection method, a first synthetic resin is injected into the mold cavity and subsequently a second synthetic resin is injected to fill up the mold cavity. In the present invention, the LMW polymer is used instead of the second resin and given a role as a gas in the gas assisted injection molding method. Such a use is completely new for the LMW polymer. It is a surprising finding that the LMW polymer having a viscosity of about 10,000 times as large as the gas viscosity; i.e., 0.0001 poise, forms IPT channels by selectively going along the thick-walled section like gas. Indeed, it had previously been believed that only gas can form IPT channels.

A ratio of (a viscosity of the LMW polymer at 120° C.) to (that at 220° C.) is 100 or more.

It is preferable that the LMW polymer has a low viscosity in the molding temperature range of the general synthetic resins (200° to 280° C.), and exhibits a rapid increase in viscosity upon cooling. The LMW polymer of the present invention has a ratio of (a viscosity of the LMW polymer at 120° C.) to (that at 220° C.) of 100 or more, preferably 500 to 20,000.

On the contrary, U.S. Pat. No. 4,140,672, which discloses a molding method with a viscous liquid, says that it is preferred to use a viscous liquid whose viscosity does not rapidly change according to temperature. That is, in view of the need to discharge the viscous liquids to the outside of the mold after molding, the viscous liquids are preferably easily discharged. Of the viscosity liquids, the non-plastic fluid generally used in the gas assisted injection molding method is most preferred.

A soft polymer such as atactic polypropylene, which has a relatively big molecular weight, a non-crystalline property or a low crystallinity and many side chaines, has a viscosity that is hardly affected by temperature. To the contrary, the LMW polymer of a straight-chain and crystalline polymer having a relatively high crystallization temperature rapidly increases its viscosity when cooled. The former polymer is suitable for U.S. Pat. No. 4,140,672 and the latter polymer is suitable for the present invention. The LMW polymer which has the viscosity hardly changing according to temperature generally has a low Vicat softening temperature. When a molding having such a LMW polymer in the inside of the thick-walled section is produced, the period necessary to cool the inside of the mold is unpreferably prolonged and producibility is lowered.

The synthetic resin and the LMW polymer are preferably compatible with each other at melting. This is important from the standpoint of recycling the molding and reusing a sprue, a runner and the like produced at molding. In view of compatibility, it is preferred that the synthetic resin and the LMW polymer belong to the same type of polymer and have different molecular weights.

FIG. 1 shows a relation between temperatures and viscosities of some polymers. The viscosity is a value at a shear rate of 1,000 (1/second). The polymers shown in FIG. 1 are described in detail in Table 1. The present invention employs the LMW polymer such as PS SB150, PS ST120 and PP 550P in FIG. 1, which has a ratio of (a viscosity at 120° C.) to (a viscosity at 220° C.) of 100 or more, preferably 500 to 20,000, and which rapidly increases its viscosity according to the decrease of the temperature.

Vicat softening temperature of the LMW polymer is 60° C. or more.

In injection molding, the molding is obtained by injecting the heat-plasticized synthetic resin into the mold cavity, setting it by cooling and then taking it out from the mold. The cooling time for setting the resin in the mold affects the molding cycle most seriously. As a setting temperature of the synthetic resin and the LMW polymer decreases, the necessary cooling time in the mold is prolonged. Therefore, though the LMW polymer is a low viscous liquid having a viscosity of 1/50 or less in relation to the synthetic resin at molding, it is preferred that the setting temperature of the LMW polymer be around that of the synthetic resin.

The setting temperature refers to a temperature, at which a polymer is set so hard that it can be taken out from the mold, and is represented by Vicat softening temperature in the present invention. Vicat softening temperature is measured according to ASTM-D1525.

In the present invention, the LMW polymer has a Vicat softening temperature of 60° C. or more, preferably 70° C. or more, more preferably 75° C. or more. The maximum Vicat softening temperature of the LMW polymer is preferably a Vicat softening temperature of the synthetic resin +10° C. because it is not preferable that the LMW polymer sets much faster than the synthetic resin during molding.

The LMW polymer cannot have a Vicat softening temperature of 60° C. or more when its molecular-weight is too small. Further, a polymer whose Vicat softening temperature does not exceed 60° C. even if its molecular weight is increased, cannot be used as the LMW polymer.

In a molding method like a gas assisted injection molding method, a fluid injected into the inside of the molding (a gas in the gas assisted injection molding method) is discharged. On the contrary, most of the fluid injected into the inside of the molding, i.e., the LMW polymer, remains inside the molding in the present invention. Accordingly, it is economically very important, in the present invention, that the fluid, i.e., the LMW polymer, has a high setting temperature. When the fluid is discharged to the outside of the molding, it is preferred that the fluid has a low setting temperature. Some of the known literature, e.g., U.S. Pat. No. 4,824,732, disclose a non-plastic fluid as the fluid, but there is no mention about a fluid having a Vicat softening temperature of 60° C. or more.

Figures 1, 2:
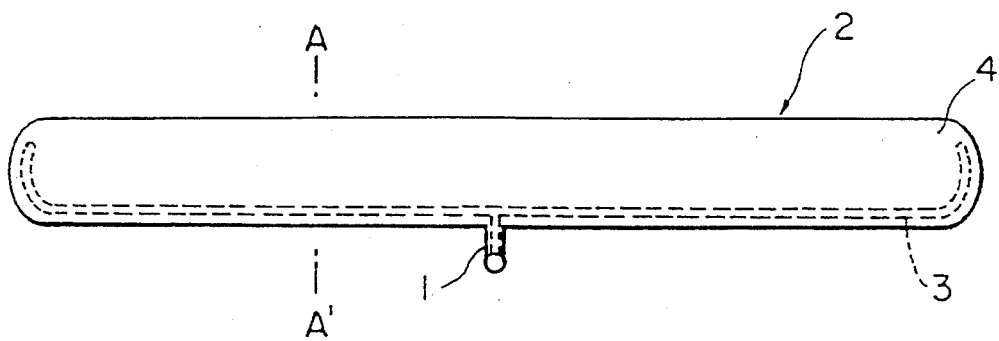
Figure 2:
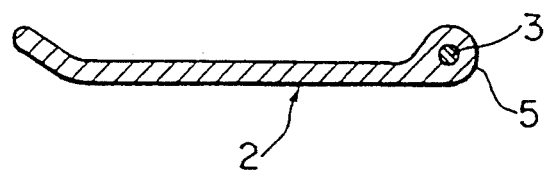
Figures 1, 3:
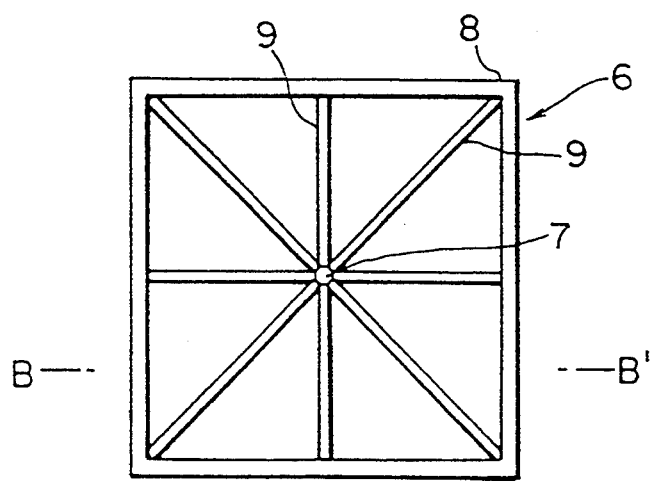
Figures 2, 3:
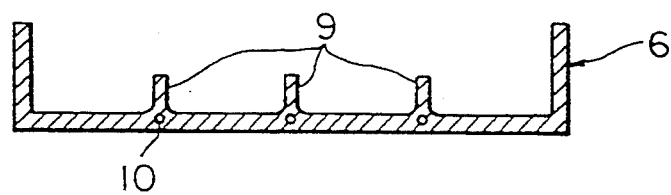

The molding of the present invention is now illustrated by using FIGS. 2-1, 2-2, 3-1 and 3-2.

FIGS. 2-1 and 2-2 show one of the moldings of the present invention. In FIG. 2-1, molding 2 produced by injecting the synthetic resin and the LMW polymer from gate 1 has IPT channel 3, from gate 1 to the vicinity of the end of injected resin 4, as a core surrounded by the synthetic resin. FIG. 2-2 is a sectional view of the molding shown, in FIG. 2-1 taken along line A—A'. IPT channel 3 is formed in the inside of thick-walled section 5 of molding 2.

FIGS. 3-1 and 3-2 also show one of the moldings of the present invention. In FIG. 3-1, molding 6 has rib 9 from gate 7 to the vicinity of the end of injected resin 8. IPT channel 10 which is filled with the IPT material is formed as a core in the root of rib 9. FIG. 3-2 is a sectional view of the molding shown in FIG. 3-2 taken along line B—B'.

In FIGS. 2-1, 2-2, 3-1 and 3-2, the moldings having one gate are illustrated. However, moldings having a plurality of gates are also contemplated for the present invention.

Figures 1, 4:
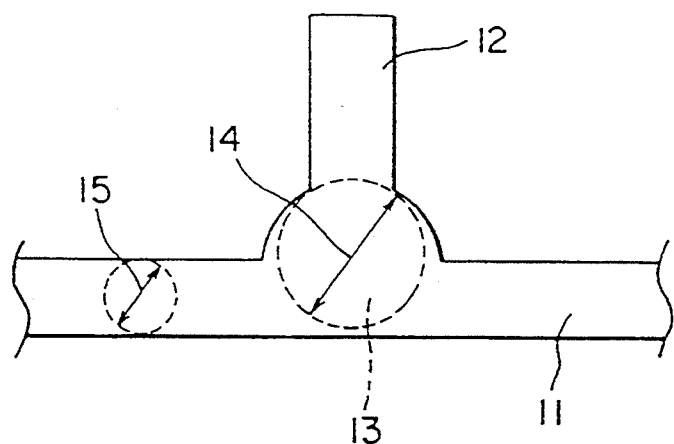
Figures 2, 4:
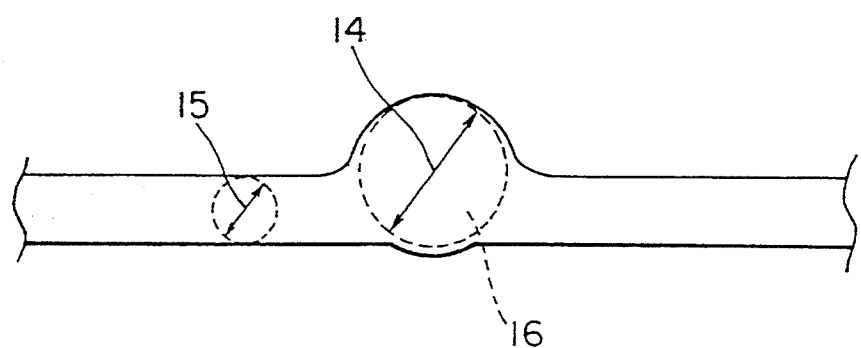

FIGS. 4-1 and 4-2 are sectional views of the thick-walled and general sections of one of the moldings of the present invention. FIG. 4-1 shows a molding having rib 12 on general section 11. The thick-walled section is formed at root 13 of rib 12 to allow the IPT material to flow inside the thick-walled section. FIG. 4-2 shows the thick-walled section particularly formed in the molding for the purpose of, for example, preventing warpage, reducing mold clamping force and the like. Numerals 14 and 15 indicate diameters of imaginary circles in the cross-section in the thick-walled and general sections of the molding, respectively.

Figures 1, 5:
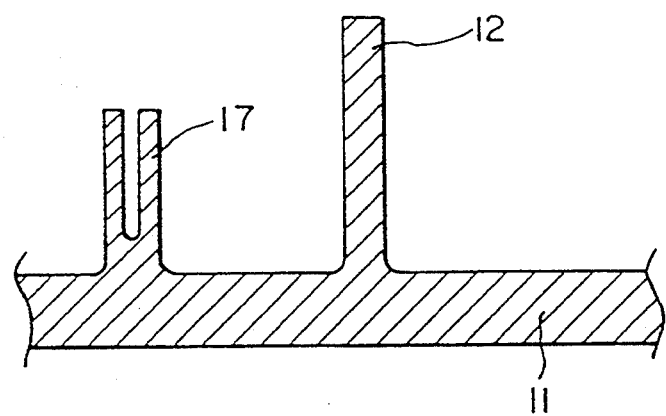
Figures 2, 5:
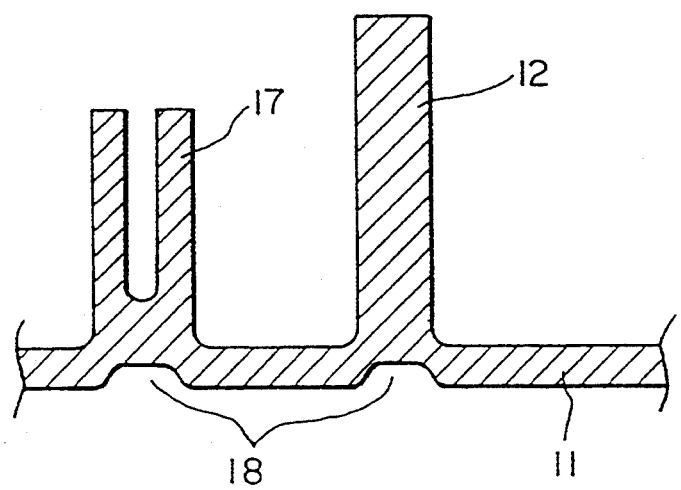

FIGS. 5-1 and 5-2 are sectional views of conventional injection moldings and show the relation between the thickness of general section 11 and the rib 12. In FIGS. 5-1 and 5-2, rib 12 and boss 17 are formed on general section 11 of the molding. In FIG. 5-1, rib 12 is formed thinner than general section 11 and small boss is formed to prevent sink marks. FIG. 5-2 shows a molding formed with thin general section 11, thick rib 12 and big boss 17. In this formation, sink mark 18 appears on the surface of the molding.

Figures 1, 6:
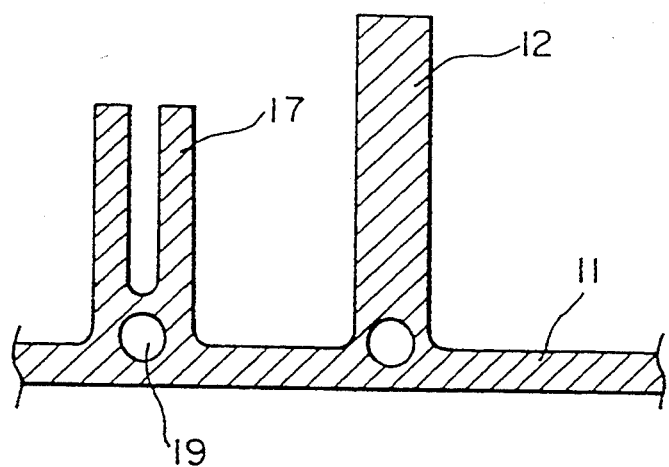
Figures 2, 6:
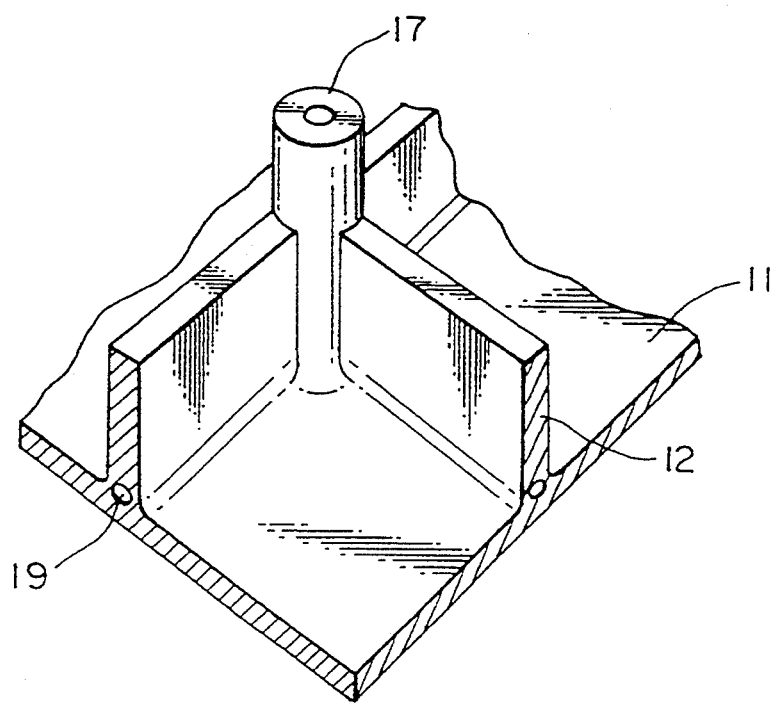

FIG. 6-1 shows a molding produced with a mold having a pattern shown in FIG. 5-2 according to the molding method of the present invention. Sink marks are prevented by forming IPT channel 19 in the inside of thick-walled section 11 at the roots of rib 12 and boss 17 and by using the IPT material of the present invention containing a foaming agent. In order to lighten the molding, the molding of FIG. 6-1 is formed with thin walls and reinforced with thick-walled ribs at a part requiring strength. FIG. 6-2 is a perspective view of the molding similar to that of FIG. 6-1.

As shown in FIGS. 2-1, 2-2, 3-1, 3-2, 6-1 and 6-2, the IPT channel of the present invention runs inside the thick-walled section from the gate to the direction that the resin flows.

The present invention also provides an injection molding apparatus, which can produce moldings of the synthetic resin as described above in a good condition. Particularly, the present invention provides an injection molding apparatus characterized in that the main injection cylinder for the synthetic resin and the sub-injection cylinder for the LMW polymer, which has a volume of 1/5 or less in relation to the main injection cylinder are connected to the same nozzle. The volume of the second cylinder is preferably from $\frac{1}{8}$ to 1/15 of that of the main cylinder.

Figure 8:
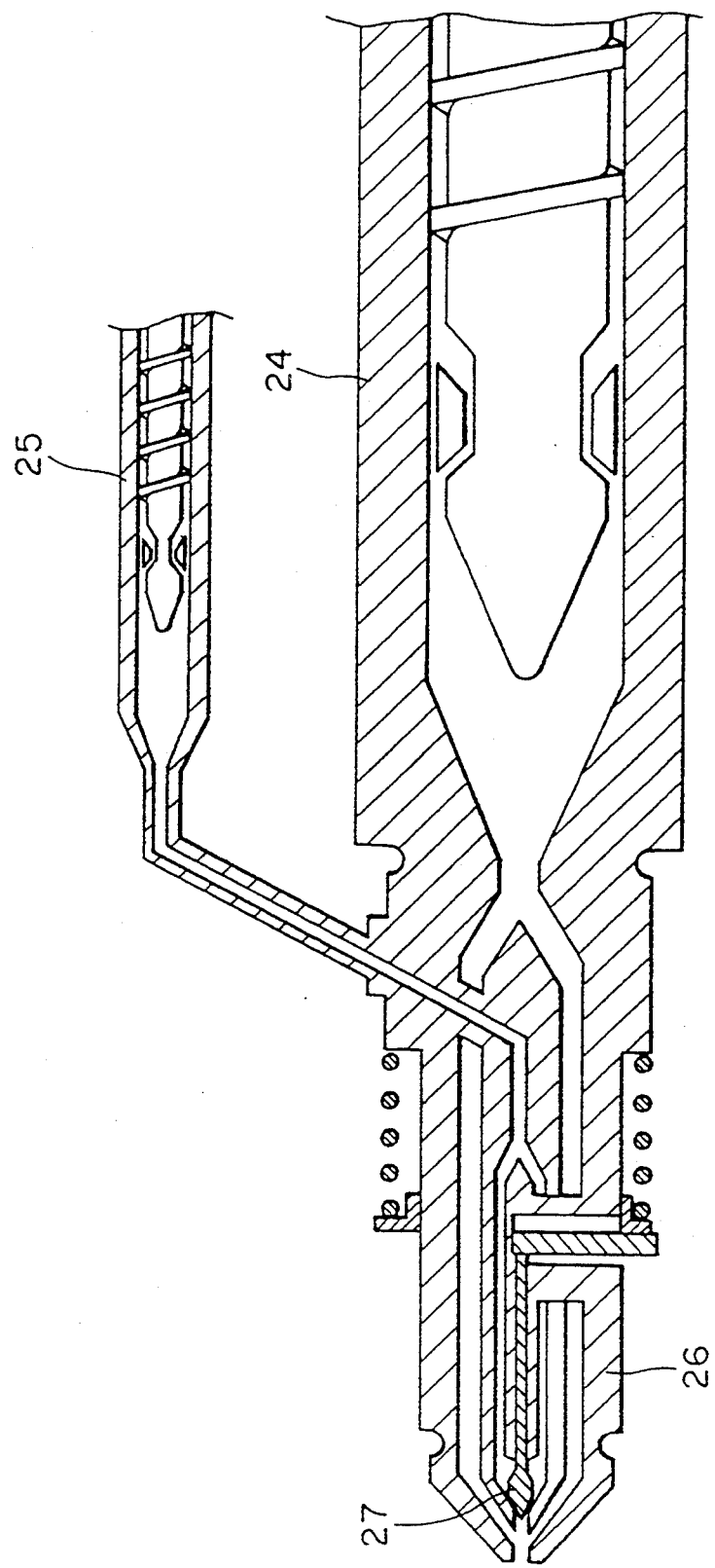
FIG. 8 is a sectional view of a injection molding apparatus in the present invention.

FIG. 8 only shows the characteristic part of the molding apparatus of the present invention. As shown in FIG. 8, the present molding apparatus has main injection cylinder 24 for the synthetic resin and sub-injection cylinder 25 for the LMW polymer, which are connected to nozzle 26. The molding of the present invention can be produced by injecting the synthetic resin from main injection cylinder 24 and subsequently injecting the LMW polymer from sub-injection cylinder 25 to fill the mold cavity. If necessary, the LMW polymer is simultaneously injected with the synthetic resin or the synthetic resin is further injected in a small amount after the injection of the LMW polymer.

The molding apparatus of the present invention can be manufactured by installing sub-injection cylinder 25 on the side of main injection cylinder 24, which is widely used for a general injection molding apparatus, and connecting main injection cylinder 24 and sub-injection cylinder 25 to special made-nozzle 26. For the sub-injection cylinder 25, either an in-line screw type or a plunger type can be used. Since the LMW polymer injected from sub-injection cylinder 25 has a low viscosity and contains a foaming agent, a nozzle having an on-off valve such as a needle on-off valve at the end part of the nozzle is preferred.

Representative molding methods for the present molding include a method comprising injecting the synthetic resin in an insufficient amount to fill the mold cavity and subsequently injecting the LMW polymer to fill up the mold cavity.

As mentioned above, it is necessary that the amount of the LMW polymer be 1/10 or less of that of the synthetic resin by volume and that the mold cavity (the molding) be shaped so as to form the IPT channel of the present invention. A low viscosity fluid has a property of selectively going along with the thick-walled section of the molding. Therefore, the molding of the present invention is obtained by thickening a wall of the parts that are desired to have the IPT channel. Since the low viscosity fluid easily flows at the root of the thick-walled rib and the like to form the IPT channel, it is most preferred to shape the molding so as to continuously form the thick-walled rib from the gate. The injection amount of the LMW polymer is almost equal to the amount necessary to form the IPT channel.

Also, a method, which comprises injecting the synthetic resin into the inside of the thick-walled section in an amount to almost fill up the mold cavity and then continuously injecting the LMW polymer in an amount to supplement the volume of the synthetic resin lost to shrinking by cooling in the mold cavity in order to form an IPT channel, can be used.

In the present invention, the IPT material, i.e., the LMW polymer incorporating a chemical foaming agent, is heat-plasticized in the sub-injection cylinder 25 and injected after the synthetic resin. At injection, it is preferred that the LMW polymer is heat-plasticized below a decomposition temperature of the chemical foaming agent in sub-injection cylinder 25 and injected while foaming at or over the decomposition temperature near nozzle 26 and/or in the mold. The viscosity of the LMW polymer becomes smaller than that of the synthetic resin when the LMW polymer is heat-plasticized. As a result, a foaming gas cannot easily go forward. Therefore, it is most preferred that the foaming agent does not decompose until it reaches near nozzle 26. A method for injecting the synthetic resin and subsequently the LMW polymer, a method comprising injecting the synthetic resin, the LMW polymer with a small amount of the synthetic resin and finally the LMW polymer, or the like can be used as desired.

DESCRIPTION OF PREFERRED EMBODIMENTS

[EXAMPLE 1]

Figures 1, 7:
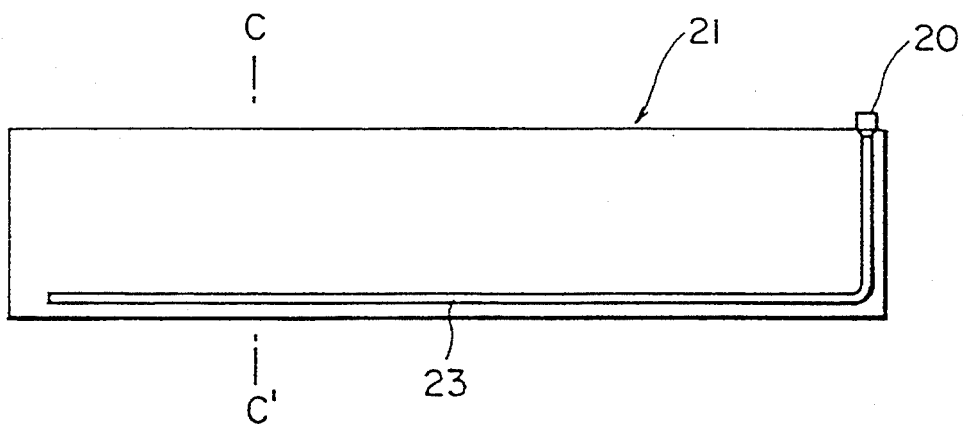
Figures 2, 7:
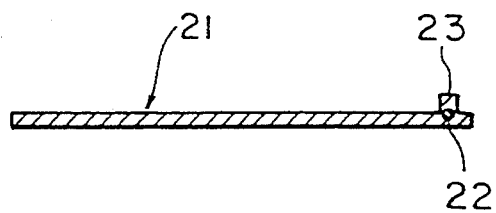

A mold having a shape of molding 21 shown in FIGS. 7-1 and 7-2 was used. Its mold cavity has a size of 380 mm $\times$ 70 mm $\times$ 3 mm and a rib having a size of 5 mm $\times$ 5 mm lengthwise. An amount of a synthetic resin which almost filled up the mold cavity was injected and then a foamable LMW polymer was injected to fill the mold cavity.

A high impact polystyrene (HIPS #492: manufactured by Asahi Chemical Industry Co., Ltd.) and a low molecular weight polystyrene (Himer ST-120: manufactured by Sanyo Chemical Industries, Ltd.) incorporating a chemical foaming agent of azodicarbonamide (manufactured by Sankyo Kasei Co., Ltd.) having a decomposition temperature of 208° C., were used as a synthetic resin and a LMW polymer, respectively. Molding was coducted by using an injection molding apparatus shown in FIG. 8. The temperatures of main injection cylinder 24 and nozzle 26 were fixed at 230° C. and the temperature of sub-injection cylinder 25 was fixed at 190° C.

Vicat softening temperatures of the used synthetic resin and the LMW polymer were 105° C. and 73° C., respectively. A ratio of (a viscosity of the LMW polymer at 120° C.) to (that at 220° C.) was 700. Viscosities of the synthetic resin and the LMW polymer at an injection temperature of 230° C. were 2,300 poise and 6.6 poise, respectively. A ratio of (a diameter of an imaginary circle in a cross-section of the thick-walled section of the molding) to (that in a cross-section of the general section of the molding) was 1.9.

A volume ratio of an injected amount into the mold cavity of the LMW polymer to that of the synthetic resin was varied to conduct injection molding. When the volume ratio of the synthetic resin to the LMW polymer was 97/3, a molding, which has an IPT channel reaching the vicinity of the end of the injected resin inside the thick-walled section, was produced The molding had good mold release characteristics, a surface without sink marks, no crack and no warpage. A minimum mold clamping force of the injection molding apparatus to produce a desired molding was measured. It was 45 tons. In contrast with this, the minimum mold clamping force was 72 tons when injection molding was conducted by using only the synthetic resin.

[EXAMPLES 2 and 3]

The same procedure as in Example 1 was conducted except for using the synthetic resins and the LMW polymers shown in Table 2. A ratio of (a viscosity of PP 550P at 120° C.) to (that at 220° C.) was 2,000. Molding was successfully conducted both in Examples 2 and 3 as well as in Example 1. A desired molding having an IPT channel filled with the LMW polymer inside the thick-walled section was obtained. The necessary clamping mold force was reduced by 40%, compared with the mold clamping force in the case of using only the synthetic resin.

[Comparative Examples 1 and 2]

The mold used in Example 1 was employed. The first and second polymers shown in Table 3 were injected by turns in a volume ratio of the first polymer to the second polymer of 97/3 to fill the mold cavity. To compare with the present invention where LMW polymer is used to produce moldings as in Examples 1 to 3, a polymer having a high molecular weight and polyethylene glycol as the second polymer were used in Comparative Examples 1 and 2, respectively.

In Comparative Example 1, the second polymer was charged only around the gate. A channel filled with the second resin was not formed inside the thick-walled section. Accordingly, sink marks appeared at the root of the ribs, and the necessary mold clamping force was not reduced.

In Comparative Example 2, an IPT channel was formed with the second polymer, but sink marks appeared at the root of ribs and it took quite a long time (2 minutes or more) to set the second polymer in the mold. Molding was not economically conducted. A ratio of (a viscosity of PEG 6000 at 120° C.) to (that at 220° C.) was 1.4. Vicat temperature of PEG 6000 was 50° C. or less. Accordingly, PEG 6000 was not used in the present invention.

TABLE 1

| symbol | polymer in detail |
| --- | --- |
| HIPS #492 | Rubber-reinforced Polystyrene: Asahi chemical Polystyrene HIPS492 (manufactured by Asahi Chemical Industry, Co., Ltd.) |
| PP M1500 | Polypropyrene: Asahi Chemical Polypro M1500 (manufactured by Asahi Chemical Industry Co., Ltd.) |
| PE J300 | High Density Polyethylene: Suntec-HD J300 (manufactured by Asahi Chemical Industry Co., Ltd.) |
| PS SB150 | Low Molecular Weight Polystyrene: Himer SB-150 (weight average molecular weight of 60,000) (manufactured by Sanyo Chemical Industries, Ltd.) |
| PS ST120 | Low Molecular Weight Polystyrene: Himer ST-120 (weight average molecular weight of 10,000) (manufactured by Sanyo Chemical Industries, Ltd.) |
| HD-PE800P | Low Molecular Weight and High Density Polyethylene: Mitsui Hi-Wax 800P (viscosity method: average molecular weight of 8,000) (manufactured by Mitsui Petrochemical Industries, Ltd.) |
| LD-PE720P | Low Molecular Weight and High Density Polyethylene: Mitsui Hi-Wax 720P (viscosity method: average molecular weight of 7,200) (manufactured by Mitsui Petrochemical Industries, Ltd.) |
| LD-PENL800 | Low Molecular Weight and High Density Polyethylene: Mitsui Hi-Wax NL800 (viscosity method: average molecular weight of 6,400) (manufactured by Mitsui Petrochemical Industries, Ltd.) |
| PP 550P | Low Molecular Weight Polypropylene: Viscol 550-P (vapor pressure osmotic pressure method: average molecular weight of 4,000) (manufactured by Sanyo Chemical Industries, Ltd.) |
| PEG 6000 | Polyethylene Glycol: Polyethylene glycol 6000 (weight average molecular weight of 7,500) (manufactured by Wako Pure Chemical Industries, Ltd.) |

TABLE 2

| | Synthethic rein | LMW polymer |
| --- | --- | --- |
| Example 2 | | |
| Polymer | Polypropyrene PP M1500 | Low Molecular Weight Polypropylene PP 550P |
| Vicat softening temperature | 153° C. | 110° C. |
| Viscosity at 230° C. | 1000 poise | 5.5 poise |
| Example 3 | | |
| Polymer | High Density Polyethyrene PE J300 | Low Molecular Weight Polypropylene PP 550P |
| Vicat softening temperature | 123° C. | 110° C. |
| Viscosity at 230° C. | 720 poise | 5.5 poise |

TABLE 3

|  | First Polymer | Second Polymer |
| --- | --- | --- |
| Comparative Example 1 |  |  |
| Polymer | Polypropyrene PPM1500 | Colored Polypropyrene PPM1500 |
| Comparative Example 2 |  |  |
| Polymer | Polypropyrene PPM1500 | Polyethylene Gecol PEG6000 |
| Vicat softening temperature | 153° C. | 50° C. or less |
| Viscosity at 230° C. | 1,000 poise | 7.3 poise |

What is claimed is:

1. An injection molded article of synthetic resin, comprising a thin-walled general section of synthetic resin containing a gate mark and a thick-walled section therein, said thick-walled section being substantially connected to said gate mark and containing in the inside of said thick-walled section an injection pressure transmission channel that is filled with a foamed injection pressure transmission material;

said injection pressure transmission material comprising a foamable low molecular weight polymer which, at injection, has a viscosity of at least 0.5 poise but less than or equal to 1/50 of the viscosity of said synthetic resin, at injection, and wherein the ratio of the viscosity of said low molecular weight polymer at 120° C. to the viscosity of said low molecular weight polymer at 220° C. is at least 100/1;

said low molecular weight polymer having a Vicat softening temperature of at least 60° C.;

said thick-walled section containing said foamed injection pressure transmission material in an amount up to 1/10 the amount of said synthetic resin, by volume.

2. The injection molding of the synthetic resin according to claim 1, wherein a ratio of a diameter of an imaginary circle in a cross-section of the thick-walled section of the molding to that of a general section of the molding is from 1.5 to 3.5.

3. The injection molding of the synthetic resin according to claim 1, wherein the amount of the injection pressure transmission material is from 1/200 to 1/10 of that of the synthetic resin by volume.

4. The injection molding of the synthetic resin according to claim 1, wherein the injection pressure transmission channel reaches 60% or more of a distance from the gate mark to the end of the injected resin.

5. The injection molding of the synthetic resin according to claim 1, wherein the viscosity of the low molecular weight polymer is 1/100 or less of that of the synthetic resin at injection, and 1 poise or more.

6. The injection molding of the synthetic resin according to claim 1, wherein the ratio of the viscosity of the low molecular weight polymer at 120° C. to that at 220° C. is from 500 to 20,000.

7. The injection molding of the synthetic resin according to claim 1, wherein Vicat softening temperature of the low molecular weight polymer is from 70° C. to Vicat temperature of the synthetic resin +10° C.

8. The injection molding of the synthetic resin according to claim 1, wherein said foamed injection pressure transmission material is substantially entirely contained within said thick-walled section.

9. The injection molding of the synthetic resin according to claim 1, wherein said synthetic resin is selected from the group consisting of polyethylenes, polypropylenes, polystyrenes, styrene-acrylonitrile copolymers, ABS resins, polyamides, polyacetals, polyesters, polyphenylene ethers, and polyvinyl chlorides.

10. The injection molding of the synthetic resin according to claim 1, wherein said thin-walled general section, except for said thick-walled section, has a thickness in the range of 1 to 6 mm.

11. The injection molding of the synthetic resin according to claim 2, wherein said thin-walled general section, except for said thick-walled section, has a thickness in the range of 1 to 6 mm.

12. The injection molding of the synthetic resin according to claim 1, wherein said foamed low molecular weight polymer is selected from the group consisting of polystyrenes and polypropylene.

13. A method for molding, which comprises:

heat-plasticizing a synthetic resin in a main injection cylinder;

heat-plasticizing an injection pressure transmission material which comprises a low molecular weight polymer having a chemical foaming agent incorporated therein, in a sub-injection cylinder to a temperature that is less than the decomposition temperature of said foaming agent;

injecting through a nozzle said synthetic resin into a mold cavity and subsequently or simultaneously therewith, injecting through said nozzle said injection pressure transmission material into said mold cavity, wherein said injection pressure transmission material is heated, when in the vicinity of the nozzle or inside said mold cavity, to a temperature that is equal to or greater than the decomposition temperature of said foaming agent;

said injection pressure transmission material having, at injection, a viscosity of at least 0.5 poise but less than or equal to 1/50 of the viscosity of said synthetic resin at injection, and wherein the ratio of the viscosity of said low molecular weight polymer at 120° C. to the viscosity of said low molecular weight polymer at 220° C. is at least 100/1;

said low molecular weight polymer having a Vicat softening temperature of at least 60° C.

14. The method according to claim 13, wherein said injection pressure transmission material is injected after said synthetic resin has been injected.

15. The method according to claim 13, wherein substantially all of the synthetic resin is injected into the mold cavity, then the injection pressure transmission material is injected into the mold, and then the remaining amount of the synthetic resin is injected into the mold.

16. The method according to claim 13, wherein said injection pressure transmission material is injected such that an injection pressure transmission channel in the interior of the mold is filled with said injection pressure transmission material.

17. The method according to claim 13, wherein said injection pressure transmission material is injected such that an injection pressure transmission channel is formed by said injection pressure transmission material.

18. A molded article produced according to the method of claim 13.

19. A molded article according to claim 18, comprising a thin-walled section and a thick-walled section; said injection pressure transmission material being in a foamed state and located substantially completely inside said thick-walled section.

20. An injection molded article of synthetic resin, comprising a thin-walled general section of synthetic resin containing a thick-walled section therein, said thick-walled section having an injection pressure transmission channel that is filled with a foamed injection pressure transmission material;

said injection pressure transmission material comprising a foamable low molecular weight polymer which, at injection, has a viscosity of at least 0.5 poise but less than or equal to 1/50 of the viscosity of said synthetic resin, at injection, and wherein the ratio of the viscosity of said low molecular weight polymer at 120° C. to the viscosity of said low molecular weight polymer at 220° C. is at least 100/1;

said low molecular weight polymer having a Vicat softening temperature of at least 60° C.;

said thick-walled section containing said foamed injection pressure transmission material in an amount up to 1/10 the amount of said synthetic resin, by volume.

* * * * *